United States Patent
Ing et al.

(10) Patent No.: US 11,208,891 B2
(45) Date of Patent: Dec. 28, 2021

(54) METHOD OF REPAIRING A FIRTREE FEATURE WITH WIRE ELECTRICAL DISCHARGE MACHINING

(71) Applicant: PRATT & WHITNEY CANADA CORP., Longueuil (CA)

(72) Inventors: Visal Ing, Sainte-Julie (CA); Ghislain Hardy, Sainte-Julie (CA); Joel Jean, St-Constant (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 131 days.

(21) Appl. No.: 16/577,321

(22) Filed: Sep. 20, 2019

(65) Prior Publication Data

US 2021/0087933 A1    Mar. 25, 2021

(51) Int. Cl.
| | | |
|---|---|---|
| *F01D 5/00* | (2006.01) | |
| *B23H 1/04* | (2006.01) | |
| *B23H 9/10* | (2006.01) | |
| *B23H 7/08* | (2006.01) | |

(52) U.S. Cl.
CPC .............. *F01D 5/005* (2013.01); *B23H 1/04* (2013.01); *B23H 7/08* (2013.01); *B23H 9/10* (2013.01); *F05D 2220/30* (2013.01); *F05D 2230/10* (2013.01)

(58) Field of Classification Search
CPC .. F01D 5/005; B23H 7/08; B23H 9/10; B23H 1/04; F05D 2230/10; F05D 2220/30
See application file for complete search history.

(56) References Cited

U.S. PATENT DOCUMENTS

| | | | |
|---|---|---|---|
| 10,024,162 B2 * | 7/2018 | Stolz | F01D 5/02 |
| 2014/0257542 A1 | 9/2014 | Li et al. | |
| 2015/0267540 A1 | 9/2015 | Grilli et al. | |
| 2016/0067836 A1 | 3/2016 | Huxol et al. | |
| 2018/0112542 A1 * | 4/2018 | Bouthillier | F01D 5/3007 |
| 2018/0161900 A1 * | 6/2018 | Yang | B23H 7/20 |
| 2018/0257189 A1 | 9/2018 | Johnson et al. | |
| 2018/0369943 A1 * | 12/2018 | Masuda | B25J 9/1692 |

OTHER PUBLICATIONS

Jun Wang et al., Geometrical Defect Detection in the Wire Electrical Discharge Machining of Fir-Tree Slots Using Deep Learning Techniques, Applied Sciences, Dec. 27, 2018, https://www.mdpi.com/2076-3417/9/1/90.

* cited by examiner

*Primary Examiner* — Jacob M Amick
*Assistant Examiner* — Charles J Brauch
(74) *Attorney, Agent, or Firm* — Norton Rose Fulbright Canada LLP

(57) ABSTRACT

Methods of repairing a part having a firtree-shaped feature requiring rework are disclosed. An embodiment of the method includes receiving the part having the firtree-shaped feature requiring rework. The part is installed in a machine configured for wire electrical discharge machining (EDM). A location of the firtree-shaped feature relative to a datum of the machine is then determined. Wire EDM is performed on the firtree-shaped feature.

19 Claims, 11 Drawing Sheets

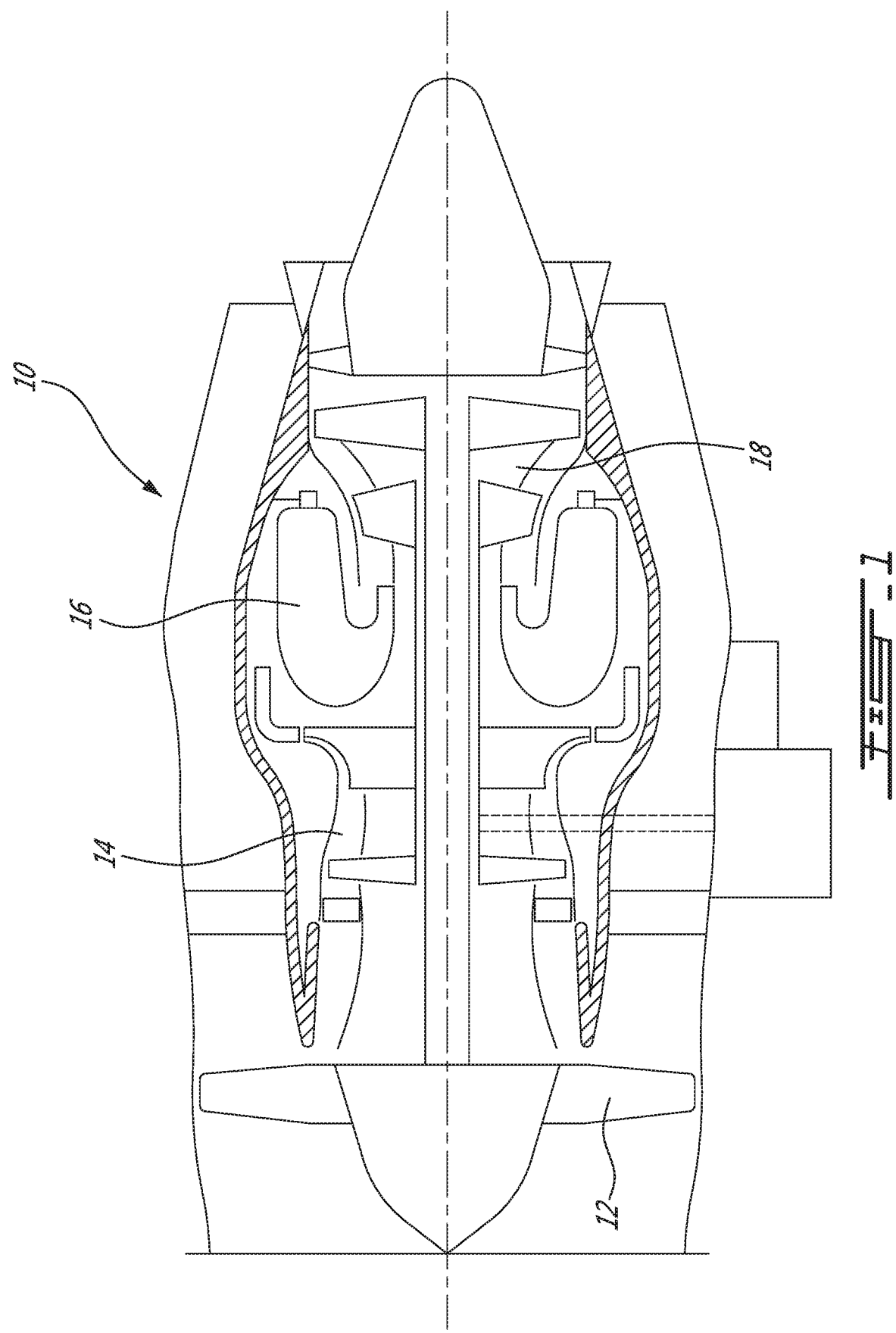

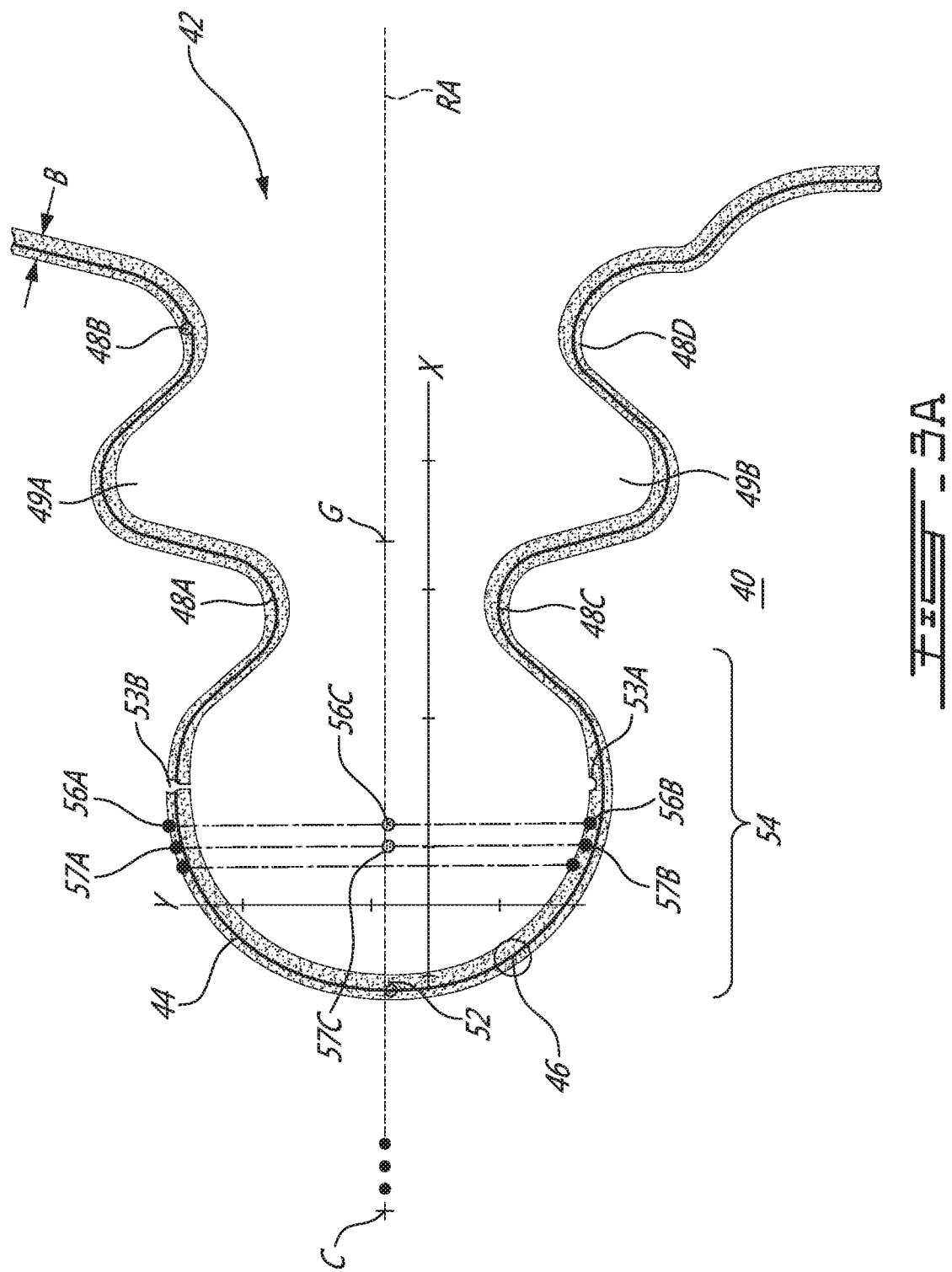

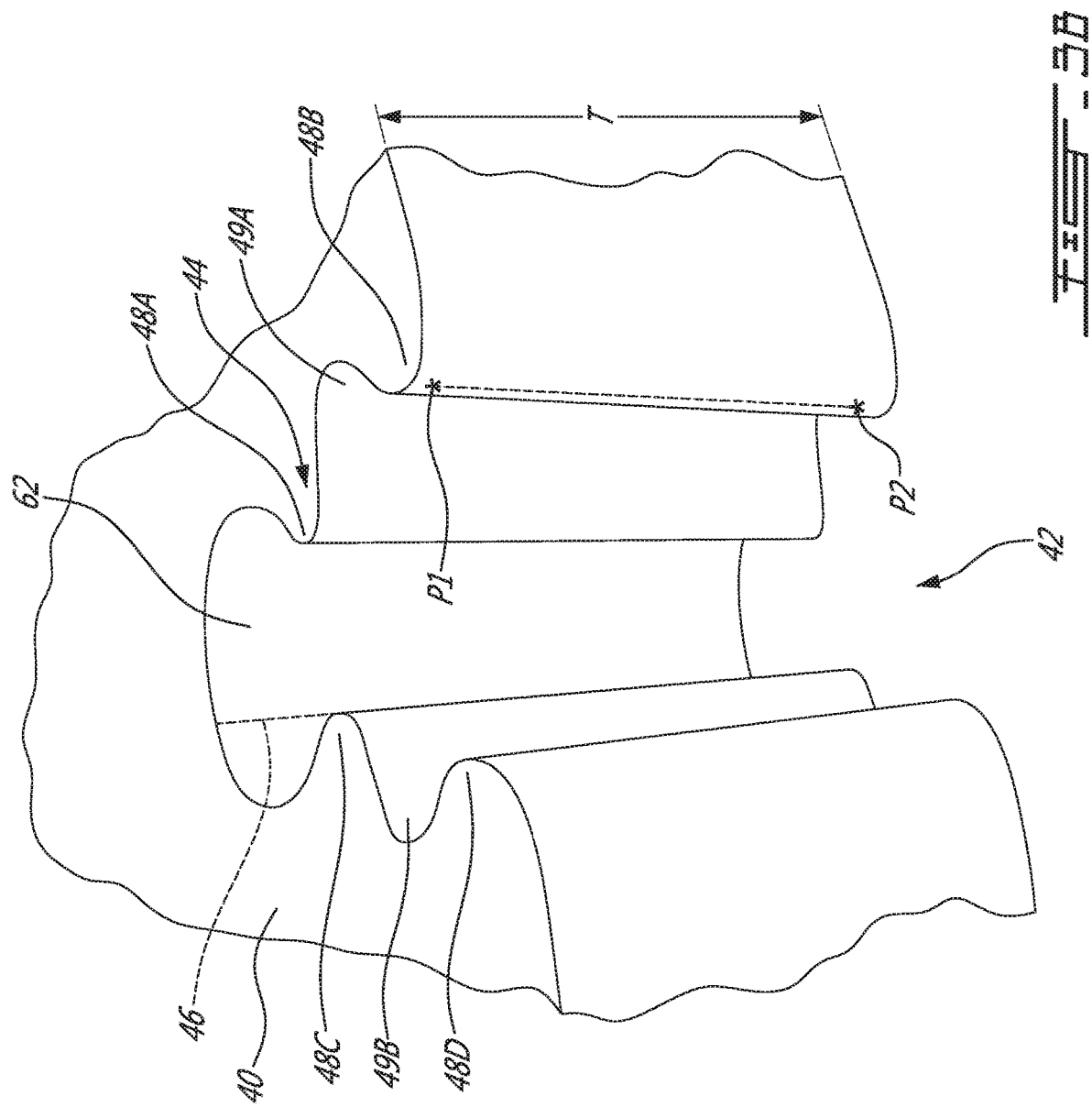

FIG. 5

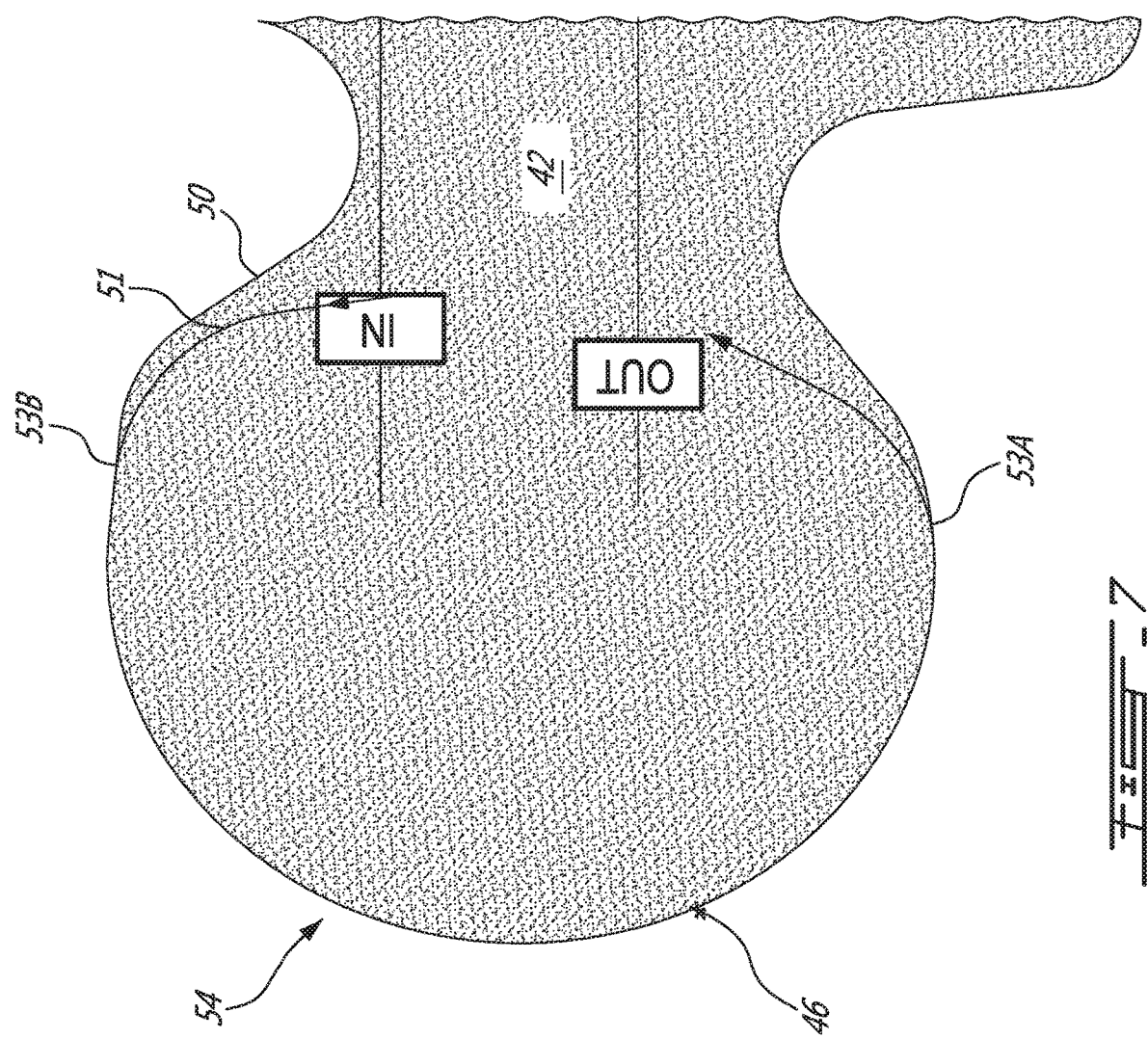

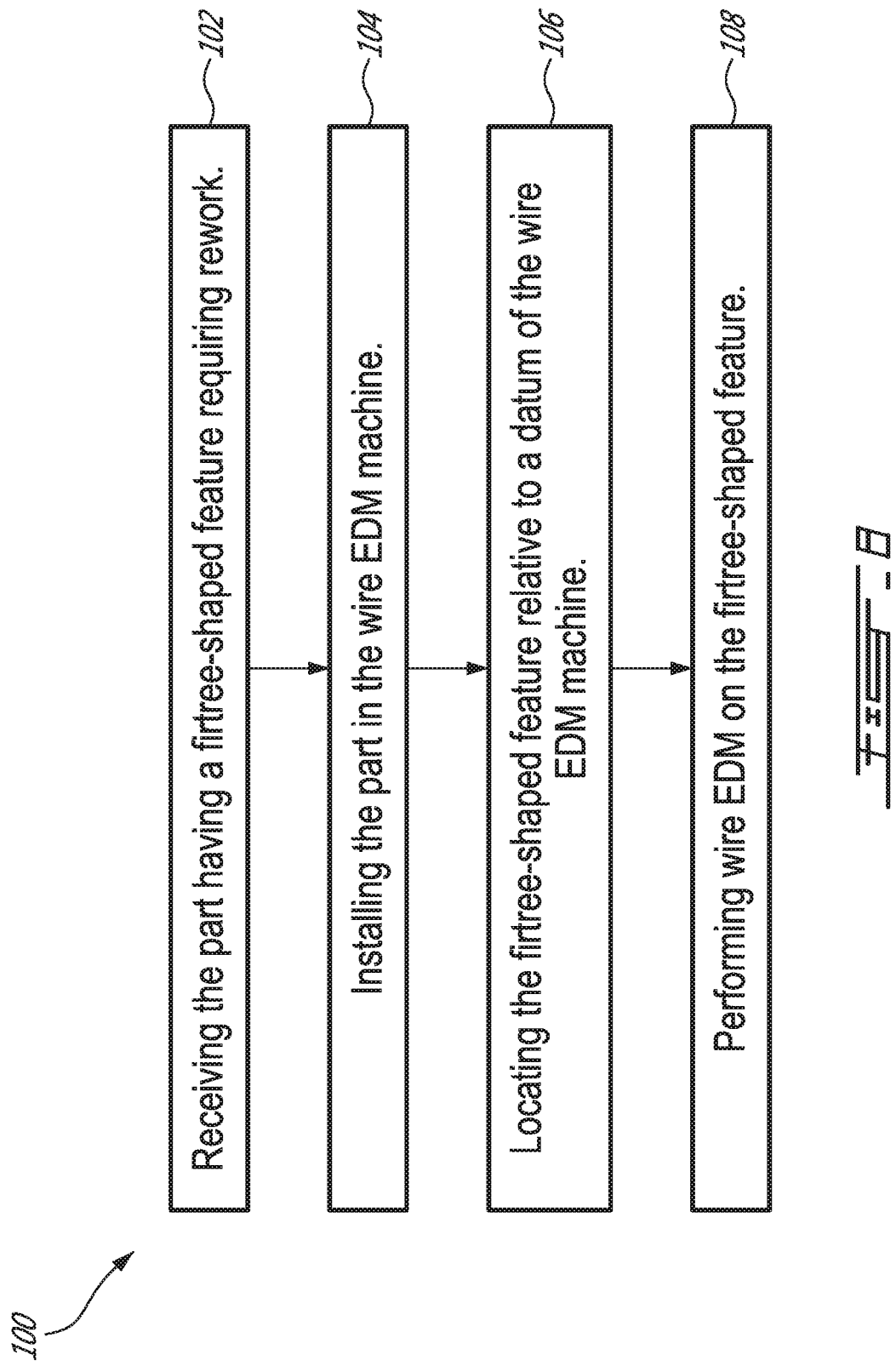

US 11,208,891 B2

METHOD OF REPAIRING A FIRTREE FEATURE WITH WIRE ELECTRICAL DISCHARGE MACHINING

TECHNICAL FIELD

The present disclosure relates generally to turbine components, and more particularly to manufacturing turbine components having firtree-shaped features.

BACKGROUND

Gas turbine engines typically include one or more bladed rotors. A bladed rotor can include blades that are mounted to a disc by the engagement of firtree-shaped fixing slots formed in the disc with respective firtree-shaped roots of the blades. Forming the slots in the discs can be done by machining such as broaching, electrical discharge machining (EDM) or milling for example. Forming the slots can be time consuming, require relatively high accuracy and can result in relatively expensive parts.

SUMMARY

In one aspect, the disclosure describes a method for repairing a part having a firtree-shaped feature requiring rework defined in the part. The method comprises:
  receiving the part having the firtree-shaped feature requiring rework;
  installing the part in a machine configured for wire electrical discharge machining (EDM);
  locating the firtree-shaped feature relative to a datum of the machine; and
  performing wire EDM on the firtree-shaped feature.

In another aspect, the disclosure describes a method of manufacturing a disc of a bladed rotor. The method comprises:
  using a machine configured for wire electrical discharge machining (EDM), machining a firtree-shaped slot in a disc-shaped workpiece using wire EDM, the firtree-shaped slot extending radially inwardly from a periphery of the workpiece;
  removing the workpiece from the machine;
  after a portion of the firtree-shaped slot requiring rework has been identified, installing the workpiece in the same or another machine configured for wire EDM;
  locating the firtree-shaped slot relative to a datum of the same or the other machine; and
  performing wire EDM on the portion of the firtree-shaped slot requiring rework.

Further details of these and other aspects of the subject matter of this application will be apparent from the detailed description included below and the drawings.

DESCRIPTION OF THE DRAWINGS

Reference is now made to the accompanying drawings, in which:

FIG. 1 depicts a schematic cross-sectional view of an exemplary gas turbine engine;

FIG. 3A depicts a top plan view of a firtree-shaped slot formed in the disc-shaped workpiece of FIG. 2A;

FIG. 3B depicts a perspective view of the firtree-shaped slot of FIG. 3A;

FIG. 5 depicts a user interface of a software application associated with the machine of FIG. 2A;

FIG. 6 depicts another user interface of the software application associated with the machine of FIG. 2A;

FIG. 7 depicts a top plan view of a portion the firtree-shaped slot of FIGS. 3A and 3B, illustrating a cutting path for a wire electrode for repairing the firtree-shaped feature using wire EDM;

DETAILED DESCRIPTION

Figure 2A:
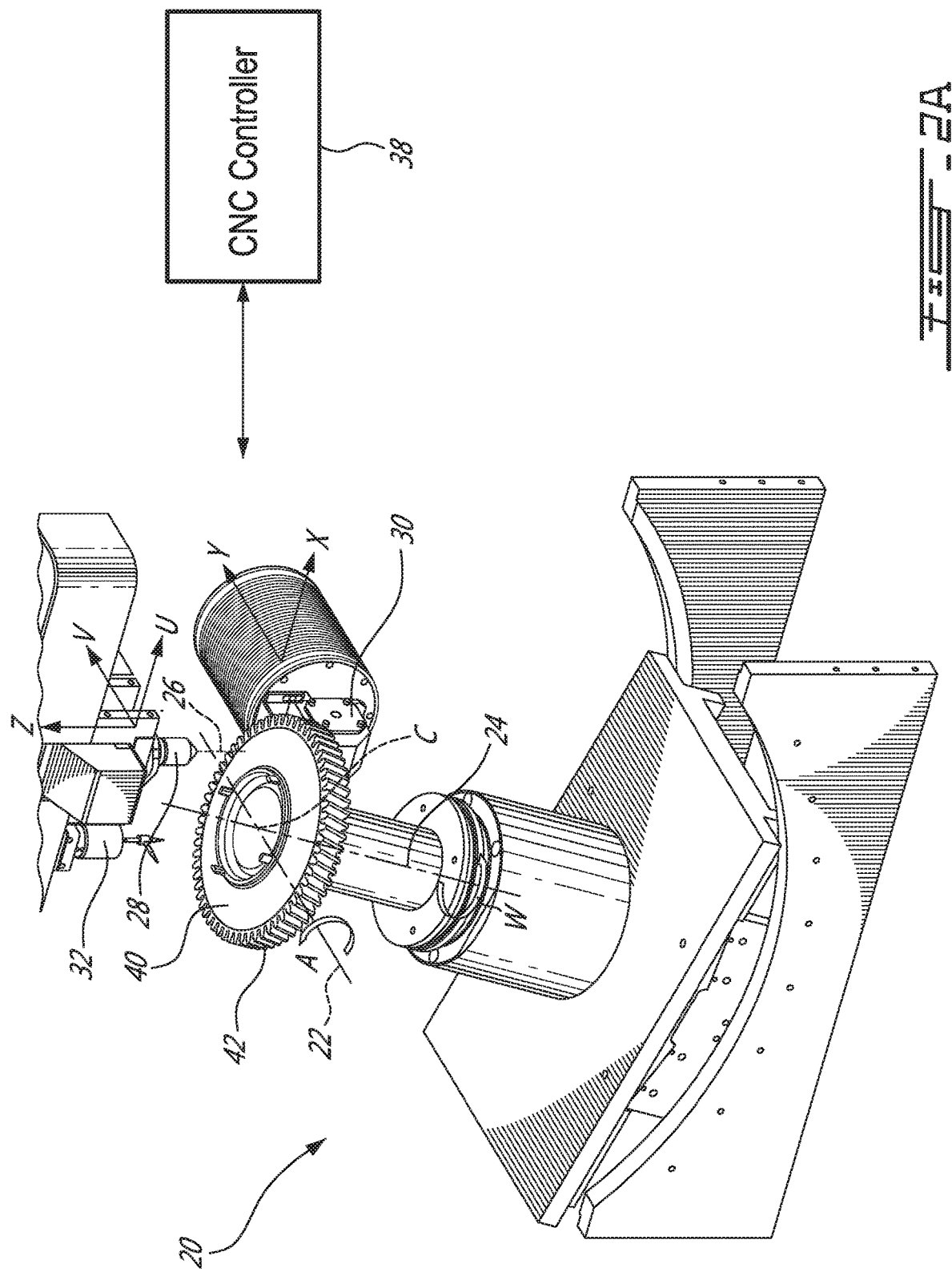
FIG. 2A depicts a perspective view of an exemplary machine configured for wire EDM having a disc-shaped workpiece installed in the machine.

The present disclosure relates to using wire EDM for manufacturing and/or repairing a part having a firtree-shaped feature. In various embodiments, aspects of the present disclosure may be particularly useful for reworking firtree-shaped slots in bladed (e.g., turbine or compressor) discs or firtree-shaped roots of blades of such bladed rotors.

Part(s) of turbine discs may be machined by wire EDM to form cavities (sometimes called "fixing slots") each having a "firtree" shape. The firtree-shaped slots may receive correspondingly shaped roots of the turbine blades therein for securely mounting the blades to the disc. Similarly, part(s) of turbine blades may be machined by wire EDM to form roots having a "firtree" shape. In some situations, the wire EDM process can leave imperfections on surfaces of a firtree-shaped feature during the process of cutting the firtree-shaped feature on the part. In some embodiments, the methods disclosed herein can permit the location or relocation of such firtree-shaped features in a machine configured for wire EDM in order to facilitate reworking of the applicable surfaces to correct the imperfection(s).

In some embodiments, the methods described herein may permit parts having such imperfections to be reworked in order to completely or sufficiently remove such imperfections using wire EDM and also keep the firtree-shaped feature within acceptable dimensional tolerances. In some embodiments, the methods described herein may permit some parts having imperfections to be salvaged thereby reducing scrap costs.

Aspects of various embodiments are described through reference to the drawings.

FIG. 1 illustrates a gas turbine engine 10 of a type provided for use in subsonic flight, generally comprising, in serial flow communication, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. FIG. 1 illustrates a turbofan turbine engine as an example, however it is understood that the present disclosure may be equally applicable to bladed rotors that are found in other types of turbine engines.

Engine 10 may include one or more bladed rotors where blades are mounted to a disc via cooperating firtree-shaped features. For example, turbine section 18 of the gas turbine engine 10 may include one or more such bladed rotors (e.g., turbine discs). Compressor 14 may include one or more such bladed rotors (e.g., compressor discs).

Figure 2B:
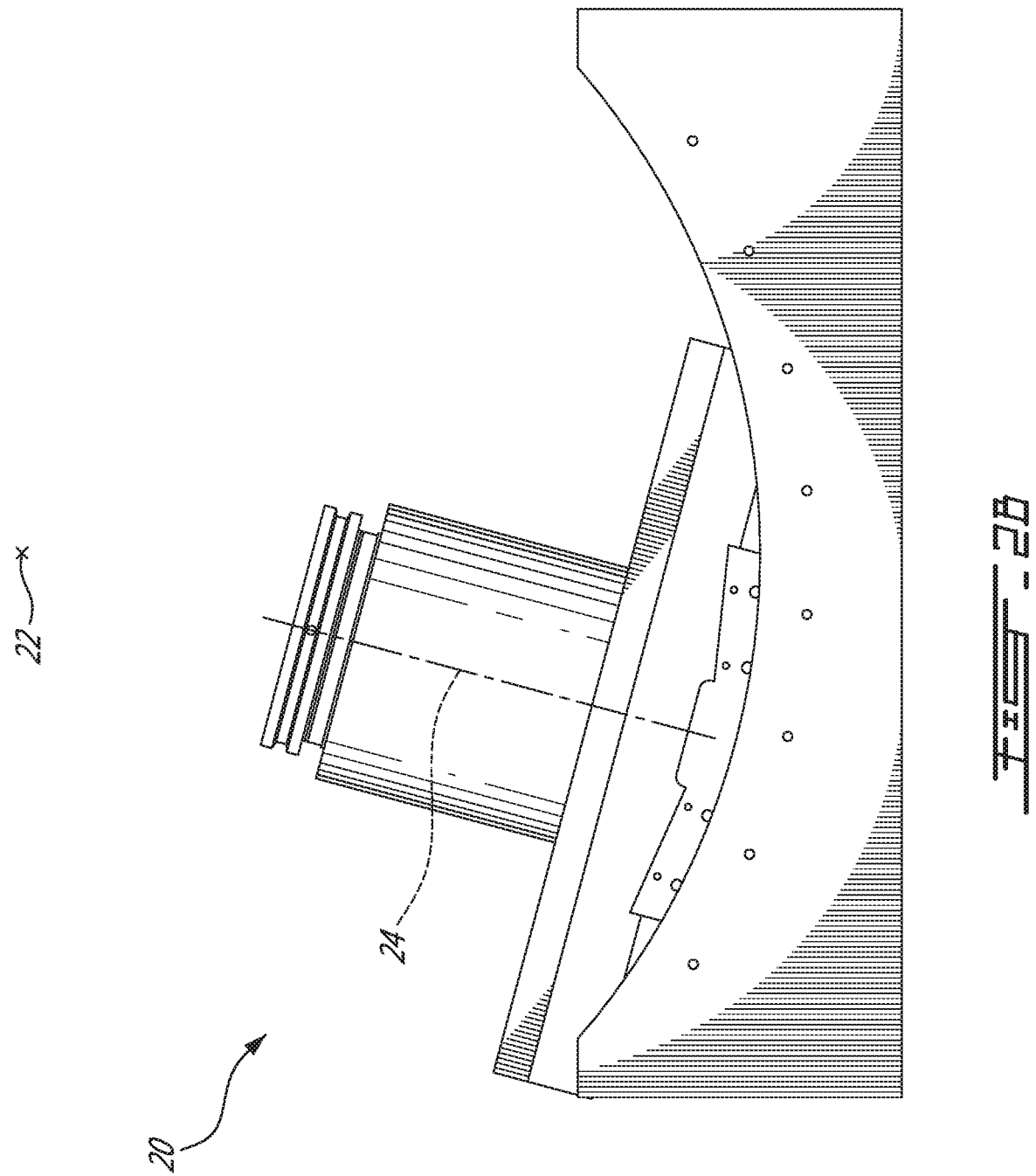
FIG. 2B depicts a front view of part of the machine of FIG. 2A.

FIG. 2A depicts a perspective view of an exemplary machine 20 configured for wire EDM having a disc-shaped workpiece 40 installed on a pivotable surface (e.g., rotary table). A front elevation view of part of the exemplary machine 20 is depicted in FIG. 2B. In some embodiments, the workpiece 40 may be secured to the rotary table using suitable clamps and/or bolts. In some embodiments, the workpiece 40 may be installed on the rotary table so that a center of rotation C (see FIG. 3A) of the workpiece 40 during use substantially coincides with the center of rotation (axis 24) of the rotary table. The disc-shaped workpiece 40 may be part of a turbine disc or other bladed disc. Machine 20 may include a computer numerical control (CNC) multi-axis motion system. Machine 20 may include one or more linear axes and/or one or more rotary axes. Machine 20 may include one or more data processors (referred hereinafter in the singular) and one or more computer-readable memories (referred hereinafter in the singular) storing machine-readable instructions executable by the data processor and configured to cause the data processor to generate one or more outputs for causing the execution of steps of the methods described herein. The data processor, memory and machine-readable instructions may be incorporated in a CNC controller 38 of machine 20.

The disc-shaped workpiece 40 shown has a plurality of firtree-shaped slots 42 distributed around the disc-shaped workpiece 40 and extending radially inwardly from a periphery of the workpiece 40. The disc-shaped workpiece 40 may be rotatable about a first axis 22 and a second axis 24 when mounted into the machine 20. In some embodiments, the pivotable surface of the machine 20 may be powered by suitable drive means (e.g., electric servo motor) to rotate (i.e., tilt) the disc-shaped workpiece 40 about the first axis 22 in response to a command by the CNC controller 38 of the machine 20. The disc-shaped workpiece 40 may be positioned on a turntable that is also powered by suitable drive means (e.g., electric servo motor). The turntable may be configured to rotate about the second axis 24 in response to a command by the CNC controller 38.

The machine 20 comprises a wire electrode 26 that may extend between an upper nozzle 28 and a lower nozzle 30. The upper nozzle 28 may be movable along a U-axis, V-axis and Z-axis, as depicted. The lower nozzle 30 may be movable along a Y-axis and X-axis. The machine 20 may also comprise a Coordinate Measuring Machine (CMM) touch probe 32 used for locating features of the workpiece 40. The CMM touch probe 32 may be movable along the U-axis, V-axis and Z-axis. The CMM touch probe 32 may alternatively be movable along a different set of axes.

In some embodiments, the disc-shaped workpiece 40 may be rotated about the first axis 22 and/or the second axis 24 to position a firtree-shaped slot 42 in a position relative to the wire electrode 26 that is suitable for conducting wire EDM using the wire electrode 26. A position and orientation of the firtree-shaped slot 42 may be determined relative to a datum such as an origin (i.e., "zero" point) such as point C or an axis of a reference coordinate system of the machine 20. Based on measurements acquired via touch probe 32 or other measurement equipment (e.g., dial indicator, laser scanner, etc.), the CNC controller 38 of the machine 20 may be used to position/orient the workpiece 40 to place the firtree-shaped slot 42 to a position and orientation suitable for conducting wire EDM using wire electrode 26. In some embodiments, the process of moving and orienting firtree-shaped slot 42 may be automated based on measurements acquired via touch probe 32 for example and/or position(s) acquired by electrical touching using the wire electrode 26 as described further below. The instructions may be configured to cause the CNC controller 38 to determine if a rotation of the disc-shaped workpiece 40 about the first axis 22 and/or the second axis 24 is necessary based on the position and orientation of the firtree-shaped slot 42. If a rotation of the disc-shaped workpiece 40 about the first axis 22 and/or the second axis 24 is necessary or desired for ease of access and/or wire EDM, the CNC controller 38 may be configured to determine the amount of rotation required and configured to issue a command to the appropriate drive means to facilitate the rotation of the workpiece 40.

The CNC controller 38 may also be configured to cause relative motion between the disc-shaped workpiece 40 and the wire electrode 26 along one or more cutting paths (tool paths) defined by a CNC program for example. The wire electrode 26, upper nozzle 28 and lower nozzle 30 may be displaced along the cutting path(s). It is understood that machines having other arrangements or other number of axes may be suitable for causing relative movement between the wire electrode 26 and the workpiece 40 to perform wire EDM.

FIG. 3A depicts a cross-sectional view of an exemplary firtree-shaped slot 42 containing an imperfection 46 that may be rectified by reworking using wire EDM. The imperfection 46 may be a linear mark (i.e. cavity, bump) and/or a deviation in surface roughness. In some embodiments, the firtree-shaped slot 42 may have a plurality of such imperfections 46. The methods are described in relation to slot 42 which is a cavity formed on a periphery of disc-shaped workpiece 40 but it is understood that aspects of the methods described herein are also applicable for reworking other firtree-shaped features such as roots of (e.g., turbine, compressor) blades for example. The firtree-shaped slot 42 may have a two-dimensional firtree profile 44 having alternating bilateral projections 48A-48D and bilateral grooves 49A and 49B on two sides opposite the radial axis (RA) extending from the center of rotation C of the workpiece 40 and passing through a point of convergence 52 in a live rim region 54 of firtree-shaped slot 42. The center of rotation C may be a center of rotation of the bladed rotor including workpiece 40 during use. The point of convergence 52 may be a radially-inner extremity of the firtree-shaped slot 42 relative to the center of rotation C. The two sides of the firtree-shaped slot 42 may define the live rim region 54. As depicted in the embodiment of FIG. 3A, the live rim region 54 may be a curved (e.g., bulbous) portion and may include an intended point of entry 53A of a repair path to an intended point of exit 53B of the repair path (e.g., see FIG. 7) and that passes through the point of convergence 52. In some embodiments, firtree-shaped slot 42 may be substantially symmetrical and the radial line RA may be an axis of symmetry of the firtree-shaped slot 42. In some situations, the radial axis RA may extend through a centroid G of the firtree-shaped slot 42. However, it is understood that the methods described herein also apply to firtree-shaped slots that are asymmetric.

FIG. 3B depicts a perspective view of the exemplary firtree-slot 42. The point of convergence 52 shown in FIG. 3A may be located at an intersection between the radial axis RA and an inner surface 62 of the firtree-shaped slot 42. As depicted in FIG. 3B, the firtree-shaped slot 42 has the two-dimensional firtree profile 44 and a thickness T. In some embodiments the firtree-shaped slot 42 may have a uniform two-dimensional firtree profile 44 across the thickness 44. However, it is understood that the methods described herein can also be used to perform rework on firtree-shaped features that have a profile that is non-uniform (e.g., tapered) across the thickness T.

Imperfections 46 on the firtree-shaped slot 42 may be detected through visual inspection by an operator or by using suitable metrology equipment. Examples of imperfections 46 include bumps, recesses, linear indications, cracks and unacceptable surface finish that may be present on the inner surface 62 of the firtree-shaped slot 42. The formation of imperfections 46 on the firtree-shaped slots 42 may occur during the process of machining the firtree-shaped slot 42 in the workpiece 40 or subsequently. Suitable processes used to machine the firtree-shaped slot 42 in the workpiece 40 may be wire EDM, broaching, milling or other material removal process(es). In some situations, the imperfection 46 may be caused as a result of an irregularity in one or more processes used for machining the firtree-shaped slot 42 or may caused due to damage.

The imperfection 46 on the firtree-shaped slot 42 may be repaired by reworking the firtree-shaped slot 42 or part(s) thereof using wire EDM. The firtree-shaped slot 42 has a tolerance band B that is magnified in FIG. 3A for illustrative purposes. The tolerance band B should be respected during the rework so that firtree-shaped slot 42 may meet dimensional specifications and be salvaged. It is understood that types of imperfections 46 repairable using the methods disclosed herein have to allow the reworked firtree-shaped slot 42 to meet applicable specifications (e.g., be within the tolerance band B) in order to be salvaged and put into operation.

Prior to reworking the firtree-shaped slot 42 using wire EDM, a position and an orientation of the firtree-shaped slot 42 may be established relative to a datum such as a reference coordinate system of the machine. The reference coordinate system may have an origin at a physical reference on the machine 20 or on the workpiece 40 (e.g., center of workpiece 40 such as point C shown in FIG. 3A). The physical reference can be related to or correspond to a software reference (origin) of a CNC program so that a tool path of the wire electrode 26 may be executed at a proper location on the workpiece 40. In some embodiments, the position and orientation of the firtree-shaped slot 42 may be adjusted to be at a specific position and orientation relative to the reference coordinate system of the machine 20. In some embodiments, the position of the firtree-shaped slot 42 may be adjusted in stages. Starting from the installed location of the firtree-shaped slot 42, the positon of the firtree-shaped slot 42 may be adjusted in a stepwise manner until the firtree-shaped slot 42 is at a specific position and orientation relative to the reference coordinate system that allows reworking using the wire electrode 26. For example, a relatively coarse positioning of firtree-shaped profile 42 can initially be done manually and fine tuned to desired tolerance using the method(s) described herein.

Figure 4:
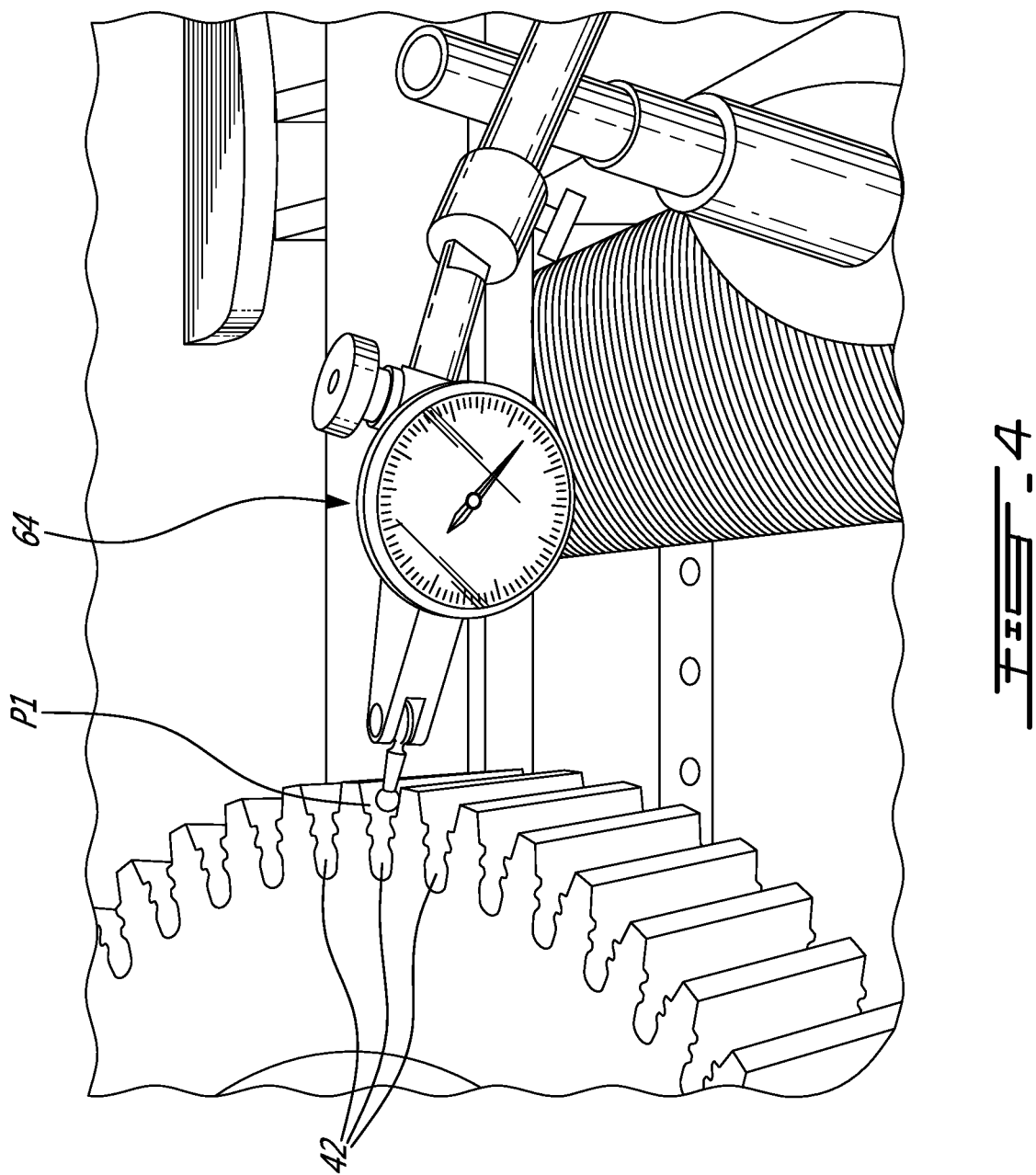
FIG. 4 depicts a perspective view of a dial indicator used to locate the firtree-shaped slot.

In some embodiments, an orientation of a surface 62 of the firtree-shaped slot 42 located along a thickness T (see FIG. 3B) of the firtree-shaped slot 42 is determined relative to the Z-axis for example. As depicted in the exemplary embodiment of the firtree-shaped slot 42 in FIG. 3B, the orientation of the surface 62 of the firtree-shaped slot 42 is determined along the thickness T of the firtree-shaped slot 42 at a location of projection 48B, which may be the radially outermost projection of the firtree-shaped slot 42. The orientation of the surface 62 may be determined by determining the location of two points P1 and P2 on the surface 62 and at different elevations along the thickness T. The orientation of the line P1-P2 defined by points P1 and P2 may be used to locate the orientation of surface 62 relative to the Z-axis. In some embodiments, the location of line P1-P2 may be selected to be substantially at a crest of the projection 48B. The locations of points P1 and P2 may be digitized using the CMM probe 32 or a dial indicator 64 as depicted in FIG. 4. The dial indicator 64 may be moved from the first point P1 along the crest of the projection 48B to the second point P2 or vice versa. The relative movement between the indicator 64 and the workpiece 40 may be controlled manually by an operator or it may be controlled by the CNC controller 38. In some embodiments, based on the coordinates of the two points P1 and P2, the surface 62 may be substantially aligned with the Z-axis for example. If the deviation from the Z-axis is above a certain threshold, a correction in the angle A (see FIG. 2A) may be determined to substantially align line P1-P2 with the Z-axis. In some embodiments, the threshold is 0.0001" (0.0025 mm) or may be selected based on the tolerance band B. The correction in the angle A may be computed using the formula:

$$\text{Compensation}_A(°) = \arctan\left(\frac{\text{Error}_A}{Z}\right), \quad \text{Formula 1}$$

where $\text{Error}_A$ is a lateral deviation in the X-Y plane between points P1 and P2, Z is the vertical distance along the Z-axis between the points P1 and P2 and $\text{Compensation}_A$ is an angular displacement of the tilt A-axis required to bring the line P1-P2 in substantial alignment with the Z-axis. The formula 1 above may be used in an iterative manner until the $\text{Error}_A$ is below the specified threshold. The workpiece 40 may then be rotated (i.e. tilted) by the calculated compensation angle about the axis 22. The rotation may be facilitated by the drive means (e.g., electric servo motor) to align the surface 62 substantially along the Z-axis.

Although the measurement is shown to be taken at the projection 48B of the firtree-shaped slot 42 for convenience and ease of access, it is understood that other locations inside the firtree-shaped slot 42 may be used to determine the orientation of the surface 62 along the thickness T of the firtree-shaped slot 42. In some embodiments, an accuracy of the measurement may be higher when taken at a radially outer projection as opposed to another radially inner location. The selected location for the measurement may depend on a size of the workpiece 40.

A position of the radial axis RA of the firtree-shaped slot 42 along the Y-axis may also be determined for example. To determine the position of the radial axis RA, one or more midpoints of the firtree-shaped slot 42 may be determined between each side of the firtree-shaped slot 42. The wire electrode 26 may be used to determine the one or more midpoints by way of electrical touching. Electrical touching may involve using the wire electrode 26 to approach the workpiece 40 and detect a presence of the workpiece 40 when the wire electrode 26 approaches the workpiece 40 and current starts to flow (i.e., sparking) between the wire electrode 26 and the workpiece 40. At that moment, the machine 20 may store a position of the wire electrode 26 at which the workpiece 40 is detected. Suitable settings (e.g., voltage, current) may be selected for electrical touching based on characteristics of the workpiece 40. For instance, a roughness, cleanliness and material conductivity of the workpiece 40 may be considered when determining the settings to be used for electrical touching in order to minimize linear marks on the workpiece 40. The depth of such linear marks may be higher when a higher current is supplied to the wire electrode 26. In addition, the higher the current supplied to the wire electrode 26 during electrical touching, the lower a precision may be for detecting the presence of the workpiece 40. In some embodiments, the current supplied to the wire electrode 26 may be set to maximize the precision and minimize a depth of an associated linear mark.

In some embodiments, the wire electrode 26 first may be positioned in a preferred area of the firtree-shaped slot 42 such as the live rim region 54 where the midpoints are desired to be determined. As depicted in FIG. 3A, the wire electrode 26 may be positioned between the imperfection 46 and an intended point of entry 53A/exit 53B of a repair in the live rim region 54 of the firtree-shaped slot 42. The workpiece 40 having the firtree-shaped slot 42 may then be completely immersed in a dielectric fluid, which cools the wire EDM process and helps dispose of material removed from the workpiece 40 during wire EDM. The wire electrode 26 may then be used to touch-off opposite sides of firtree-shaped slot 42 using electrical touching in order to determine the location of the midpoint(s) firtree-shaped slot 42. In order to determine a first midpoint of the firtree-shaped slot 42, the wire electrode 26 configured for electrical touching may be used to determine a position of points 56A and 56B on the surface 62. Points 56A and 56B may be within the live rim region 54 of the firtree-shaped slot 42 and be located on opposite sides of the radial axis RA of the firtree-shaped slot 42. The wire electrode 26 may be moved from point 56A to point 56B or vice versa to determine the positions of the wire electrode 26 at each point 56A and 56B. The movement of the wire electrode 26 may be done manually by an operator (e.g., by jogging Y-axis movement in relatively small increments) or such movement may carried out automatically by the CNC controller 38. The distance between points 56A and 56B may then be determined.

Using the measurements of points 56A and 56B, a first midpoint 56C between the points 56A and 56B may be computed. The first midpoint 56C may coincide with the radial axis RA of the firtree-shaped slot 42.

Using the position of the first midpoint 56C, an amount of deviation of the first midpoint 56C in the Y-axis relative to the X-axis (Y=0) may be determined. If the error along the Y-axis is above a certain threshold, a correction in the angle of the rotary W-axis (axis 24) may be determined. In some embodiments, the threshold is 0.0001" (0.0025 mm) or may be selected based on the tolerance band (B). The correction in the angle W may be computed using the formula:

$$\text{Compensation}_W(°) = \arctan\left(\frac{\text{Error}_Y}{X}\right) \quad \text{Formula 2}$$

where $\text{Error}_Y$ is a deviation along the Y-axis of the position of midpoint 56C from Y=0, X is a distance along the X axis between the center of rotation of the workpiece 40 and the midpoint 56C and $\text{Compensation}_W$ is an angular displacement of the rotary W-axis required to bring the midpoint 56C in substantial alignment with the X-axis. The workpiece 40 may then be rotated by the calculated compensation angle about the rotary axis 24. The rotation may be facilitated by the turn table to align the midpoint 56C substantially on the X-axis. The use of formula 2 may also serve to align the radial axis RA of the firtree-shaped slot 42 substantially along the X-axis.

To validate that the radial axis RA resides on the X-axis, a second midpoint 57C of the firtree-shaped slot 42 may be determined between points 57A and 57B using the process described above at a second position along the X-axis. In some embodiments, a plurality of midpoints may be computed to determine that the radial axis RA of the firtree-shaped slot 42 resides on the X-axis. The formula 2 above may be used in an iterative manner until the Error is below the specified threshold. In some embodiments, an average of several midpoints 56C, 57C may be used for the purpose of improving accuracy of the alignment of the firtree-shaped slot 42 with the X-axis.

Although points 56A, 56B, 57A and 57B are disposed in live rim region 54 and used to compute midpoints 56C, 57C of the firtree-shaped slot 42, it is understood that points at other locations could be used to compute one or more midpoints elsewhere along the radial axis RA of the firtree-shaped slot 42. In the depicted embodiment, one or more rework cutting paths 51 (shown in FIG. 7) may be used to rework a portion of the firtree-shaped slot 42. Specifically, the one or more rework cutting paths 51 may be used to rework a portion of the firtree-shaped slot 42 proximate the live rim region 54 and accordingly, it may be desirable to use electrical touching and compute the one or more midpoints in the portion of the firtree-shaped slot 42 that is being reworked. However, in some embodiments, the rework cutting paths 51 may be configured to machine an entirety of the firtree-shaped slot 42. In these cases, a different set of points to compute different midpoints along the radial axis RA of the firtree-shaped slot 42 may be used. In some embodiments, a dimensional accuracy of a midpoint determined at a radially outer location within the firtree-shaped slot 42 may be higher than a midpoint determined at a radially inner location.

Figure 5:
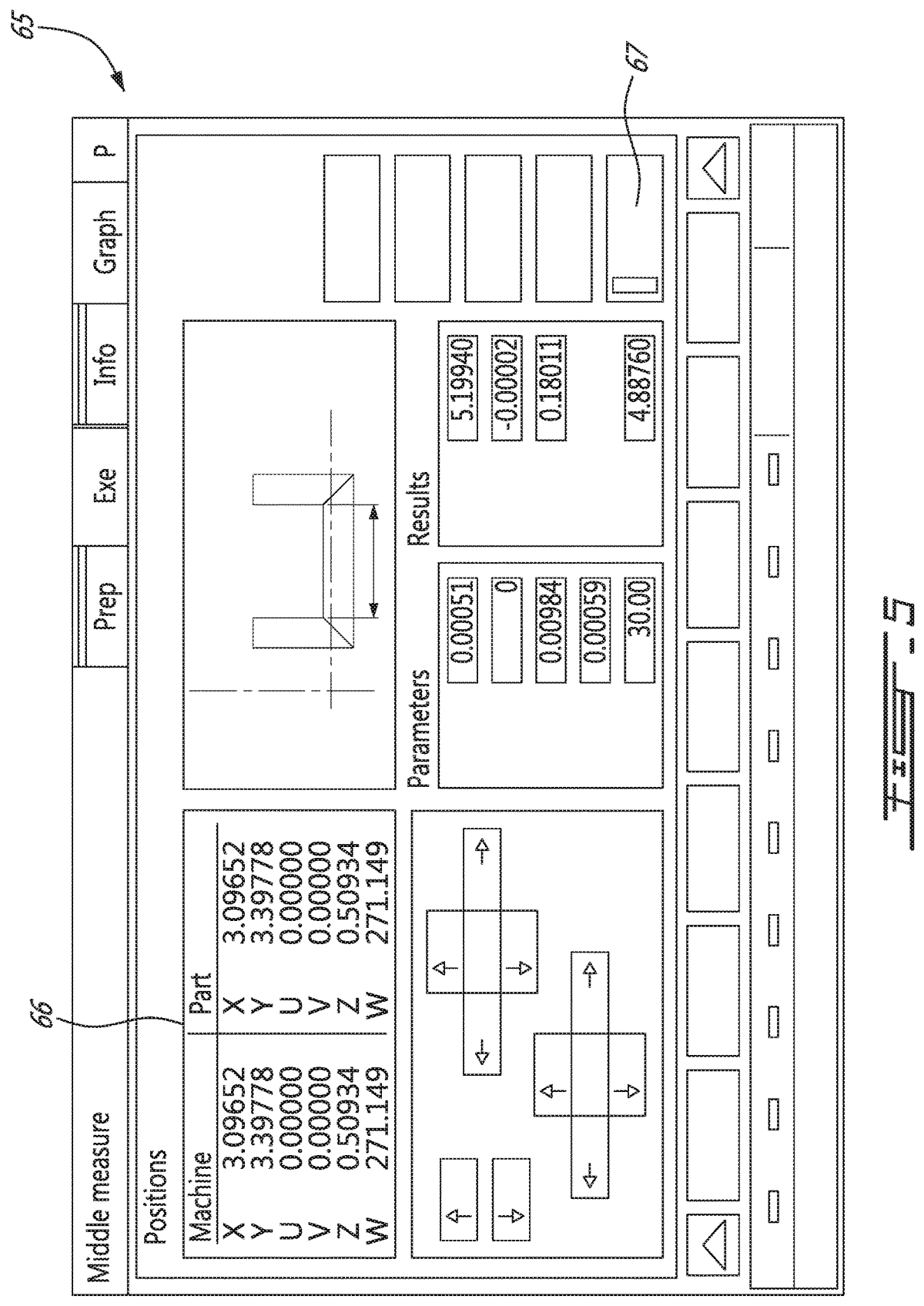

FIG. 5 depicts an exemplary user interface 65 of a CNC software application running on CNC controller 38 of machine 20. The position of wire electrode 26 to a machine coordinate system and a coincident part coordinate system is shown in table 66. The user interface 65 may facilitate the location of one or more midpoints 56C and 57C by way of semi-automation. An operator or the CNC controller 38 may be prompted to move the wire electrode 26 to a start location and click on an "Activate" button on the user interface 65 in order to launch automatic jogging movements and electric touching at opposed points 56A and 56B and the computation of the midpoints 56C. The rotary compensation movement of the W-axis based on formula 2 above may also be carried out automatically by CNC controller 38 in order to orient the radial axis RA along the X-axis for example.

In reference to FIG. 3A, in some embodiments, a location of the intersection between the surface 62 of the firtree-shaped slot 42 and the radial axis RA may be determine in order to locate the firtree-shaped slot along the X-axis. The wire 26 and electrical touching may again be used to locate the point of convergence 52 located at the bottom of the firtree-shaped slot 42. The point of convergence 52 may be located by positioning the wire 26 at the previously computed midpoint 56C for example and moving (e.g., jogging) the wire 26 radially inwardly along the radial axis RA until the point of convergence 52 on the surface 62 is located by way of electrical touching.

In some embodiments, the lower nozzle 30 of the machine 20 may be adjusted relative to the upper nozzle 28 of the machine 20 or vice versa to vary the orientation of the wire 26. Such relative positioning between the upper nozzle 28 and the lower nozzle 30 may be used to orient the wire parallel to the Z-axis or to place the wire at another orientation that is oblique to the Z-axis if required depending on the geometry of the firtree-shaped slot 42. The orientation of the wire 26 may be adjusted as a function of the perpendicularity of the workpiece 40 to the Z-axis.

FIG. 6 depicts another exemplary user interface 68 of a CNC software application running on CNC controller 38 of the machine 20. The position of wire electrode 26 to a machine coordinate system and a substantially coincident part coordinate system is shown in table 69A. The user interface 68 may have a "vertical alignment" button 69C which may be pressed to launch an automated procedure to orient the wire 26 to be parallel with the Z-axis if necessary.

To orient the wire electrode 26 to be parallel with the Z-axis, the procedure may determine a corresponding positional offset between the upper nozzle 28 and the lower nozzle 30. Based on the determined offset, the wire electrode 26 may be adjusted to orient the wire electrode 26 to be parallel with the Z-axis in preparation for machining the workpiece 40. In some embodiments, the procedure to orient the wire electrode 26 to be parallel with the Z-axis may involve using a tool having a thin eyelet. The wire electrode 26 may be positioned to extend through an opening of the eyelet. The lower nozzle 30 may be fixed in the X and Y axis in the center of the eyelet while the upper nozzle 28 may be positioned just above the eyelet and moved along the U and V axis to a plurality of positions to find its center within the eyelet using electrical touching. Then, the upper nozzle 28 may be moved upward to a higher Z position and then moved again along the U and V axes in order to find the center of the eyelet again. Other suitable approaches to establish a desired orientation of the wire electrode 26 may be used. Table 69B indicates a lateral offset and a height between the upper nozzle 28 and the lower nozzle 30. Table 69B also indicates an angle of the wire 26 relative to the Z-axis.

In some embodiments, the orientation of the wire electrode 26 may be adjusted as a function of the perpendicularity of the workpiece 40 to the Z-axis. The automatic adjustment may include orienting the wire 26 to be parallel with a surface of the workpiece 40. In some embodiments, the CMM probe 32 may be used to determine an orientation of the surface of the workpiece 40. Based on the determined orientation of the surface, the wire electrode 26 may be oriented to be parallel with the surface of the workpiece 40. For example, the methods described herein can be used to perform rework on firtree-shaped slots 42 that have a substantially uniform or non-uniform through-thickness profile.

FIG. 7 depicts the live rim region 54 of the firtree-shaped slot 42 of FIG. 3A. To repair the imperfection 46, the wire electrode 26 may be programmed to move along one or more rework cutting paths 51 via suitable CNC program (e.g., G-codes) generated via suitable CAD/CAM system based on a CAD model of the slot 42. In some embodiments, the rework cutting paths 51 may be configured to also remove linear marks that may have been formed by an electrical touching procedure used to locate firtree-shaped slot 42. The rework cutting paths 51 may be configured to machine an entirety of firtree-shaped slot 42 or only one or more portion(s) of firtree-shaped slot 42 depending on the number and location(s) of imperfection(s) 46. In some embodiments, different rework cutting paths 51 may be used to perform different rework wire EDM passes on workpiece 40 using the same or different process parameters. In some embodiments, one rework cutting path 51 may be used to perform multiple rework wire EDM passes on workpiece 40. In some embodiments, the one or more rework cutting paths 51 used for repairing the firtree-shaped slot 42 are the same as or different from the one or more original cutting paths 50 used for forming the firtree-shaped slot 42 in the first place. Lead-in and/or lead-out portions that may be tangential to the surface of the workpiece 40 may be incorporated into the rework cutting path(s) 51 in cases where the rework cutting path(s) 51 may be shorter than the original cutting path 50.

In some embodiments, determining the one or more rework cutting paths 51 includes the application of tool offsets to the one or more original cutting paths 50 (or part thereof) used for forming the firtree-shaped slot 42 to progressively move the wire 26 into the workpiece 40 with successive passes. The portion of the one or more original cutting paths 50 and the amount of offsets to be applied may be determined based on the nature of the imperfection 46 on the firtree-shaped slot 42. For instance, in a case where the imperfection 46 is a recess formed on a surface of the firtree-shaped slot 42, it may be required that a certain offset be applied to a portion of the one or more original cutting paths 50 containing the recess in order to partially or fully smooth out the surface 62 at the location of the imperfection 46.

In some embodiments, the offsets applied to the one or more original cutting paths 50 or rework cutting paths 51 for the purpose of reworking may be limited by an upper and a lower limit based on the tolerance band B illustrated in FIG. 3A and optionally also based on the starting location of firtree-shaped slot 42 within tolerance band B. An upper offset limit and a lower offset limit may serve as a maximum and minimum, respectively, to which the one or more original cutting paths 50 can be modified to produce the one or more rework cutting paths 51 while still respecting the tolerance band B.

In some embodiments, the offsets applied to the one or more original cutting paths 50 or rework cutting paths 51 may be set to create a spark condition that provides a desired amount of material removal. In some embodiments, this may require that the wire electrode 26 be within a few microns from the region of the firtree-shaped slot 42 being reworked. The material being cut as well as a thickness of the firtree-shaped slot 42 may also be considered when setting the offsets to be applied to the one or more original cutting paths 50 or rework cutting paths 51.

In some embodiments, multiple (e.g., three) cutting passes of wire EDM may be performed to repair the firtree-shaped slot 42. The multiple passes may be conducted using different sets of parameters (e.g., spark energy intensity, machine path offset between different cutting passes, polishing) to reach a desired surface finish condition, metallurgy characteristics and geometry precision. Increasing the number of passes may improve surface condition, metallurgy characteristics and geometric precision of the repaired firtree-shaped slot 42. However, increasing the number of passes could also result in longer reworking time and higher operating costs. Therefore, each of the multiple passes may be tailored to optimize the repair of the firtree-shaped slot 42. Spark energy intensity may refer to the current intensity, the voltage intensity and the duration of its on-time. Higher energy spark intensities may allow for higher material removal rates, but may increase the likelihood of linear defects (i.e. cavities, bumps) being formed and may provide a rougher surface finish of the firtree-shaped slot 42. Therefore, it may be desirable to have higher spark energy intensities for the initial cutting pass(es) and lower spark energy intensities for subsequent passes. The subsequent cutting passes having lower spark energy intensities may assist in repairing rough surfaces created by the initial cutting passes and correcting metallurgical characteristics of surfaces of the slot 42 to provide a desired surface integrity.

The material being cut as well as a thickness of the slot 42 may be considered when setting the spark energy intensities of the passes.

In some embodiments, an amount of material expected to be removed in a cutting pass may be considered when setting a tool offset to be applied to an original cutting path 50 or rework cutting path 51 for a subsequent cutting pass.

In some embodiments, three cutting passes may be performed to repair the firtree-shaped slot 42. A first cutting pass, a "roughing" pass, may be set to a first spark energy intensity to provide a high material removal rate. The roughing pass may form rough surfaces and/or linear defects (i.e. cavities, bumps) on surfaces of the firtree-shaped slot 42. A second cutting pass ("finishing" pass) and a third cutting pass ("polishing" pass) each may be set to a spark energy intensity that is lower than the first spark energy intensity. These passes may be used to smoothen rough surfaces created by the roughing pass and correct metallurgical characteristics of surfaces of the firtree-shaped slot 42 to provide a desired surface integrity. Performing cutting passes at higher spark energy intensities, may increase the formation of rough surfaces and/or linear defects on the firtree-shaped slot 42. To minimize the formation of rough surfaces and/or linear defects on the firtree-shaped slot 42, a speed of the wire electrode 26 may be increased for cutting passes performed at higher spark energy intensities. In some embodiments, a speed of the wire electrode 26 may be greater for the first cutting pass in comparison to the second and third cutting passes.

Figure 8:
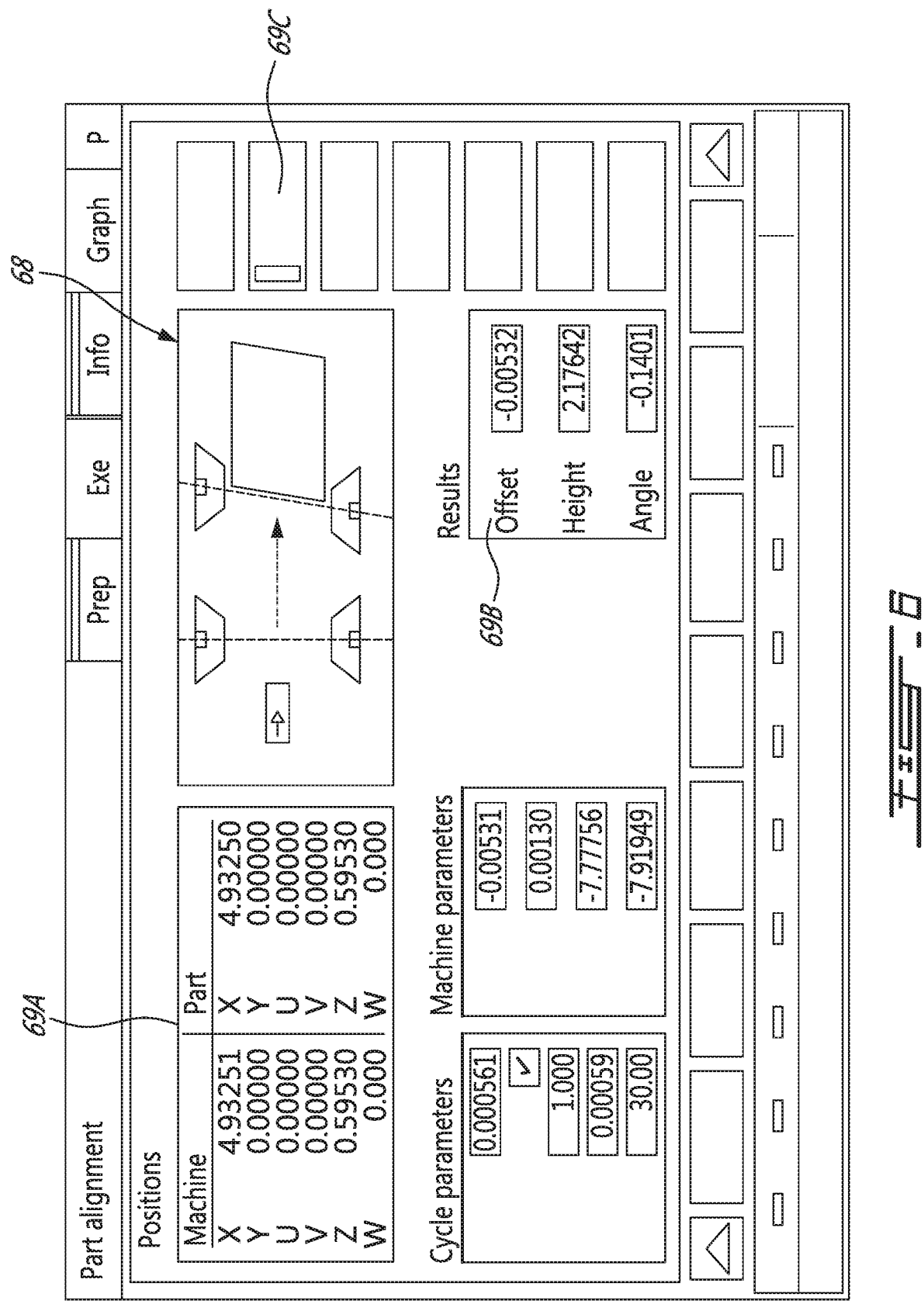
FIG. 8 depicts a flow chart of an exemplary method for repairing a part having a firtree-shaped feature.

FIG. 8 is a flowchart illustrating an exemplary method 100 for repairing a firtree-shaped feature of a part using wire EDM. Method 100 can be performed using machine 20 described herein or another machine. It is understood that aspects of method 100 can be combined with aspects of other methods described herein. In various embodiments, method 100 includes:

receiving the part (e.g., workpiece 40) having a firtree-shaped feature (e.g., firtree-shaped slot 42) requiring rework (see block 102);

installing the part in machine 20 configured for wire EDM (see block 104);

locating the firtree-shaped feature relative to a datum of machine 20 (see block 106; and performing wire EDM on the firtree-shaped feature (see block 108).

In some embodiments, method 100 may also include detecting one or more imperfections 46 that may be repaired by wire EDM rework. The imperfection(s) 46 may be detected by visual inspection. Alternatively, the imperfection(s) 46 may be detected using metrology equipment.

Installing the part (e.g., workpiece 40) in machine 20 may include securing (e.g., clamping) workpiece 40 onto machine 20 and optionally centering workpiece 40 about rotary axis 24.

Locating the firtree-shaped feature 42 relative to a datum of machine 20 may include one or more steps described above and/or other part-locating approach(es) that may provide acceptable accuracy.

Performing wire EDM on the firtree-shaped feature 42 may include performing one or more (e.g., three) wire EDM passes on one or more portions of the firtree-shaped feature 42.

Figure 9:
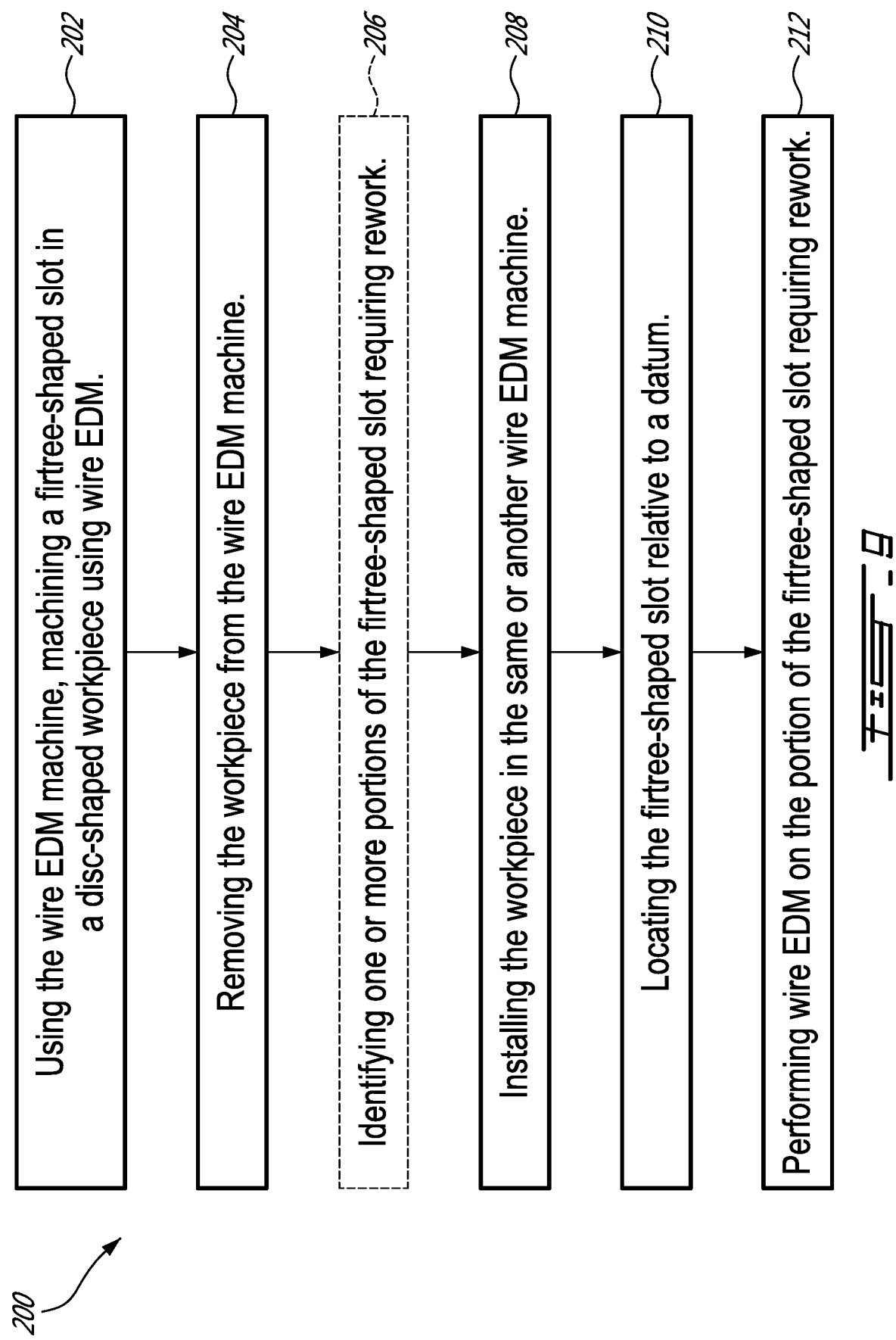
FIG. 9 depicts a flow chart of an exemplary method for manufacturing a disc of a bladed rotor having a firtree-shaped feature.

FIG. 9 is a flowchart illustrating an exemplary method 200 for manufacturing a disc of a bladed rotor having a firtree-shaped profile (e.g., firtree-shaped slot 42). Method 200 can be performed using machine 20 described herein or using another machine. It is understood that aspects of method 200 can be combined with aspects of other methods described herein. In various embodiments, method 200 includes:

using the wire EDM machine 20, machining firtree-shaped slot 42 in a disc-shaped workpiece 40 using wire EDM, the firtree-shaped slot 42 extending radially inwardly from a periphery of the workpiece 40 (see block 202);

removing the workpiece 40 from the machine 20 (see block 204);

after a portion of the firtree-shaped slot 42 requiring rework has been identified, installing the workpiece 40 in the same or another wire EDM machine (see block 208);

locating the firtree-shaped slot 42 relative to a datum of the same or the other wire EDM machine (see block 210); and performing wire EDM on the portion of the firtree-shaped slot requiring rework (see block 212).

Method 200 may include the original machining of firtree-shaped slot 42 by using wire EDM or other material removal process(es). The identification of the portion(s) requiring rework (see optional block 206) may include the detection of one or more imperfections 46 by way of visual inspection for example. It is understood that the original wire EDM of the firtree-shaped slot 42 and the reworking of the firtree-shaped slot 42 may be conducted on the same or on different wire EDM machines.

The above description is meant to be exemplary only, and one skilled in the relevant arts will recognize that changes can be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for repairing a part having a firtree-shaped feature requiring rework defined in the part, the method comprising:

receiving the part having the firtree-shaped feature requiring rework, the firtree-shaped feature having a firtree profile and a thickness;

installing the part in a machine configured for wire electrical discharge machining (EDM);

locating the firtree-shaped feature relative to a datum of the machine, locating the firtree-shaped feature including locating an orientation of a surface of the firtree-shaped feature along the thickness of the firtree-shaped feature; and performing wire EDM on the firtree-shaped feature.

2. The method as defined in claim 1, wherein locating the firtree-shaped feature relative to the datum of the machine includes locating a position and an orientation of the firtree-shaped feature relative to a reference coordinate system of the machine.

3. The method as defined in claim 1, wherein performing wire EDM comprises performing a plurality of wire EDM passes in a region of the firtree-shaped feature, the wire EDM passes having a process parameter of different values.

4. The method as defined in claim 3, wherein the region defines only part of the firtree-shaped feature.

5. The method as defined in claim 3, wherein the process parameter is a spark energy intensity.

6. The method as defined in claim 1, wherein:
the surface of the firtree-shaped feature has a projection and a groove; and
locating the orientation of the surface of the firtree-shaped feature along the thickness of the firtree-shaped feature includes locating an orientation of the projection along the thickness of the firtree-shaped feature.

7. The method as defined in claim 1, wherein:
the firtree-shaped feature has a radial axis that extends through a center of rotation of the part and a radially-inner extremity of the firtree-shaped feature relative to the center of rotation; and
locating the firtree-shaped feature includes locating the radial axis.

8. The method as defined in claim 7, wherein locating the radial axis includes locating a midpoint between two points on the firtree-shaped feature and on opposite sides of the radial axis.

9. The method as defined in claim 7, wherein:
the firtree-shaped feature is a slot; and
the two points are in a live rim of the firtree-shaped feature.

10. The method as defined in claim 9, comprising locating the two points using electrical touching with a wire of the machine.

11. The method as defined in claim 7, wherein locating the firtree-shaped feature includes locating an intersection between the surface of the firtree-shaped feature and the radial axis.

12. The method as defined in claim 11, comprising locating the intersection between the surface of the firtree-shaped feature and the radial axis using electrical touching with a wire of the machine.

13. The method as defined in claim 1, wherein the part is a disc and the firtree-shaped feature is a slot.

14. A method of manufacturing a disc of a bladed rotor, the method comprising:
using a machine configured for wire electrical discharge machining (EDM), machining a firtree-shaped slot in a disc-shaped workpiece using wire EDM, the firtree-shaped slot extending radially inwardly from a periphery of the workpiece, the firtree-shaped slot having a firtree-shaped profile and a thickness;
removing the workpiece from the machine;
after a portion of the firtree-shaped slot requiring rework has been identified, installing the workpiece in the same or another machine configured for wire EDM;
locating the firtree-shaped slot relative to a datum of the same or the other machine, locating the firtree-shaped slot including locating an orientation of a surface of the firtree-shaped slot along the thickness of the firtree-shaped slot; and
performing wire EDM on the portion of the firtree-shaped slot requiring rework.

15. The method as defined in claim 14, wherein performing wire EDM on the portion of the firtree-shaped slot requiring rework comprises performing a plurality of wire EDM passes on the portion of the firtree-shaped slot requiring rework, the wire EDM passes having a process parameter of different values.

16. The method as defined in claim 15, wherein the process parameter is a spark energy intensity.

17. The method as defined in claim 14, wherein:
the firtree-shaped slot has a radial axis that extends through a center of rotation of the bladed rotor and a radially-inner extremity of the firtree-shaped slot relative to the center of rotation;
locating the firtree-shaped slot includes locating a position of the radial axis; and
locating the firtree-shaped slot includes locating an intersection between the firtree-shaped slot and the radial axis.

18. The method as defined in claim 17, locating the radial axis includes locating a midpoint between two points on the firtree-shaped slot and on opposite sides of the radial axis.

19. A method for repairing a part having a firtree-shaped feature requiring rework defined in the part, the method comprising:
receiving the part having the firtree-shaped feature requiring rework;
installing the part in a machine configured for wire electrical discharge machining (EDM);
locating the firtree-shaped feature relative to a datum of the machine; and
performing wire EDM on the firtree-shaped feature, wherein:
performing wire EDM comprises performing a plurality of wire EDM passes in a region of the firtree-shaped feature, the wire EDM passes having a process parameter of different values; and
the process parameter is a spark energy intensity.

* * * * *